Patented Sept. 9, 1930

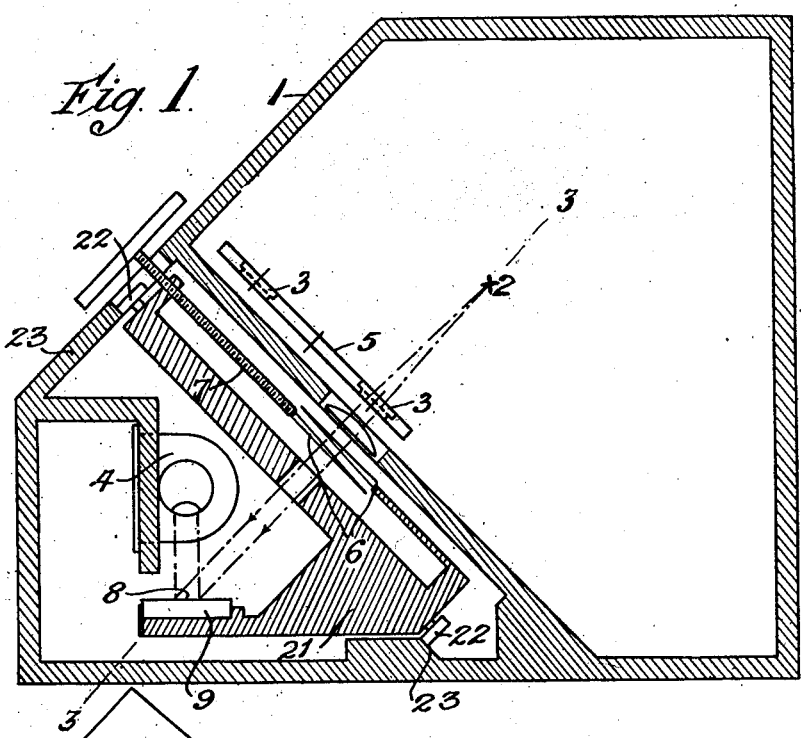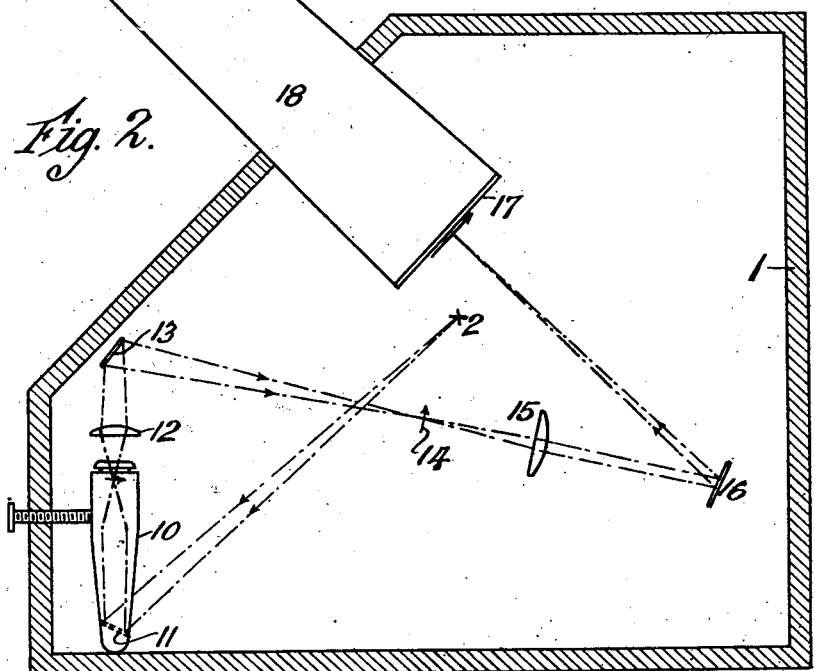

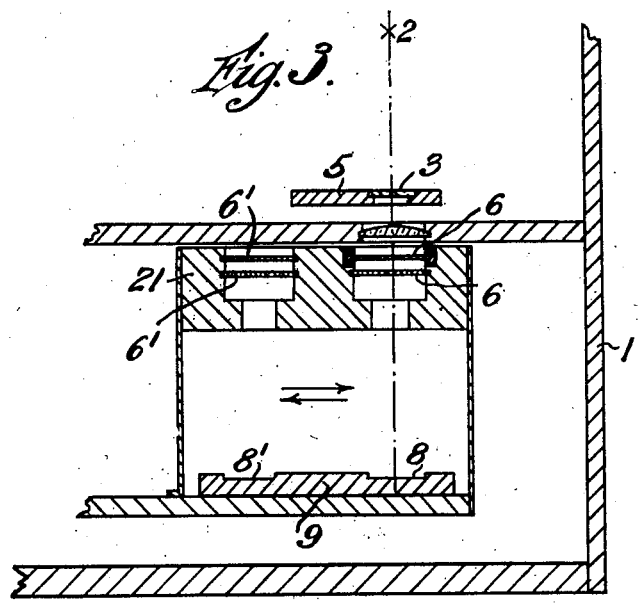

1,775,148

UNITED STATES PATENT OFFICE

FRANK TWYMAN AND JOHN PERRY, OF LONDON, ENGLAND, ASSIGNORS TO ADAM HILGER, LTD., OF LONDON, ENGLAND

COLORIMETER

Application filed August 30, 1929, Serial No. 389,469, and in Great Britain August 18, 1928.

This invention relates to a colorimeter employing a light responsive device other than the eye enabling a ready determination of the colour of any objects to be made.

Various instruments have been devised for measuring intensity and luminosity, employing a sensitive element such as a thermopile or a photo-electric cell.

Instruments of this type hitherto constructed have had for their object the determination of the intensity of the light emitted by, transmitted by, or reflected from certain objects, either as a whole or wave length by wave length throughout the spectrum. Trichromatic analysis can only be obtained from the latter by a laborious process of integration.

The subject of the present invention is a colorimeter for analyzing the light from a specimen in terms of primary colours, comprising a device which is quantitatively responsive to light, means for transmitting light from the specimen to the device, means for indicating the quantitative response of the device to such light, and means for ensuring that the sensitivity curve of the device conforms to the spectrum analysis curve of a primary colour.

For trichromatic analysis three light responsive devices would be used, or if light filters are used, a single light responsive device can be employed, provided it has the necessary range of sensitivity, and the sensitivity curves for the three primary colours would be obtained by combining the light responsive device successively with three different light filters.

By the use of appropriate light responsive device or devices with or without filters as may be required for each primary colour, the colour of the light to be measured is accurately determined in an objective manner by readings for the three primary colours. The result is specified as definite amounts of each of the three primary colours and a total luminosity value, these results being referred to readings taken for a light beam of standard luminosity and spectral energy distribution. By the use of known data this determination can be expressed in any other form by conversion of the numerical terms of the specification thus obtained.

The means for determination of the total luminosity of the light under test is incidental to the arrangement for determination of the colour.

The characteristics of the filter suitable for use in combination with any given light responsive device, if required are to be determined by the sensitivity characteristics of the light responsive device and the known data of the trichromatic analysis of monochromatic radiation in terms of the primaries employed for the purpose.

The filter, since it depends upon the type of transmission required which is different for different types of light responsive devices, may be composed of either a transparent material coloured to have the requisite properties of transmission, or a liquid containing substances in solution of definite concentrations producing the requisite properties of transmission, or any combination of similar selectively absorbing bodies.

The accompanying drawing shows by way of example an embodiment of the invention.

Figures 1 and 2 are diagrammatic sections of the apparatus in different parallel planes omitting unnecessary details and Figure 3 is a cross sectional view taken on the line 3—3 of Figure 1.

In Figure 1 a box 1 serves to carry the various parts and to exclude extraneous light. 2 is a source of light, 3, 3 are light filters having the required spectrum analysis for use in conjunction with the photo-electric cell 4. The filters are mounted in a revolving frame 5 enabling a rapid change to be made from one primary colour to another. The beam of light from the source passes through neutral tint wedges 6 and 6', adjustable by means of a screw 7, and falls on the specimen at location 8 on the tray 9. Said tray 9 is also adapted to hold a standard sample or specimen at location 8' which is brought into the path of the beam of light by sliding the entire structure or body 21 carrying the tray and the tint wedges 6 and 6' at right angles to the plane of the paper, moving by means of rollers 22 on the body 21, along guides 23 formed on the box or casing 1. The movement of the body or structure 21 takes place in the direction of the arrows of Figure 3 and thus it will be seen that the specimen with tint wedges 6 on the one hand and the standard sample with tint wedges 6' on the other hand, may be rapidly and easily brought into and out of the path of light coming from the source 2 and actuating the photo-electric cell 4.

Figure 2 shows the means for indicating the response of the photo-electric cell. The source of light 2 in the plane of Figure 1 and therefore outside that of Figure 2 is used in conjunction with the electrometer 10. A beam of light as shown is reflected from the mirror 11, the emergent deflected beam passing through the lens 12 which forms after reflection by the mirror 13 an enlarged image at 14 of the cross wire mounted in the entrance tube to the electrometer. This image is further magnified by the lens 15 which by the aid of a mirror 16 projects a final image on the grey glass screen 17. The position of the image can be seen by means of the viewing box 18 which cuts off extraneous light.

The tint wedges 6 are provided in duplicate on the structure 21, one set oposite each position in the tray so that one set is used with the specimen and the other with the standard to enable a rapid change from one to the other to be made. This will obviate the inaccuracy liable to ensue due to the variation in the sensitivity of the photo-electric cell with time.

From readings obtained at the wedge settings the relative intensities of the incident light are determined for which the responses of the corrected photosensitive elements are equal. The ratio which the primary components in the unknown colour bear to the standard colour for the respective primary corrected photosensitive element, will be the reciprocal of the ratio between corresponding relative intensities as so determined. If these reciprocal values for the respective primaries be $\rho_R$, $\rho_G$ and $\rho_B$, the specification of the colour in terms of the standard will be $$\frac{\rho_R}{3}R \frac{\rho_G}{3}G \frac{\rho_B}{3}B,$$

where R, G and B denote the primary colorimetric units for which the photosensitive elements have been corrected. This specification may be transposed and stated in any other form when the relation between R, G and B and the new unit is known.

What we claim is:—

1. A colorimeter for analyzing the light from a sample in terms of primary colors comprising a device quantitatively responsive to light of different colors arranged to receive the light from the sample, an indicating device quantitatively actuated by the light responsive device, a supporting body for the sample and a standard specimen, tint wedges mounted on said supporting body in locations corresponding to those of the sample and standard specimen, and movable colored light filters adapted to be disposed between the source of light and light-responsive device.

2. A colorimeter for analyzing the light from a sample in terms of primary colors comprising a device quantitatively responsive to light arranged to receive the light from the sample, an indicating device quantitatively actuated by the light responsive device, a movable carrier for the sample and for a standard specimen, calibrated light reducing means one adjustable relatively to the other and mounted on the said carrier in locations corresponding to those of the sample and standard specimen, and three movable light filters adapted to be disposed between the source of light and light-responsive device.

3. A colorimeter for analyzing the light from a sample in terms of primary colors comprising a device quantitatively responsive to light arranged to receive the light from a sample, an indicating device quantitatively actuated by the light responsive device, a filter means between the source of light and sample, a movable carrier for said sample and a standard specimen, and tint wedges adjustable one relatively to the other and mounted on said carrier in locations corresponding to those of the sample and standard specimen.

4. A colorimeter for analyzing the light from a sample in terms of primary colors, a movable carrier for the sample and a standard specimen, tint wedges mounted on said carrier in locations corresponding to those of the sample and standard specimen, respectively, a photoelectric cell, an electrometer connected to the photoelectric cell, a rotating filter carrier and a plurality of light filters thereon each adapted to be disposed between the source of light and sample and specimen.

5. A colorimeter for analyzing the light from a sample in terms of primary colors comprising a supporting body for a sample and a standard specimen, a photoelectric cell to receive light from the sample and specimen, an indicator connected to the photoelectric cell, tint wedges on the supporting body between the source of light and the photoelectric cell, and a filter between the source of light and the photoelectric cell.

6. A colorimeter for analyzing the light from a sample in terms of primary colors comprising a source of light, a movable carrier for a sample and a standard specimen, tint wedges on the carrier between the source of light and the sample and specimen, a filter between the source of light and the sample and specimen, a device quantitatively responsive to light to receive light from the sample and specimen, and an indicator connected to said device.

In testimony that we claim the foregoing as our invention, we have signed our names this 21st day of August, 1929.

FRANK TWYMAN.
JOHN PERRY.